(12) United States Patent
Gabay et al.

(10) Patent No.: US 10,646,879 B2
(45) Date of Patent: May 12, 2020

(54) SMART WASTE CONTAINER

(71) Applicant: ZOHAR CLEAN TECH. LTD., Kefar Saba (IL)

(72) Inventors: Chanan Gabay, Kefar Saba (IL); Uzi Segal, Tel-Mond (IL); Tsachi Shohat, Ramat Gan (IL)

(73) Assignee: ZOHAR CLEAN TECH. LTD., Kefar Saga (IL)

( * ) Notice: Subject to any disclaimer, the term of this patent is extended or adjusted under 35 U.S.C. 154(b) by 0 days.

(21) Appl. No.: 16/093,961

(22) PCT Filed: Jan. 10, 2018

(86) PCT No.: PCT/IL2018/050035
§ 371 (c)(1),
(2) Date: Oct. 15, 2018

(87) PCT Pub. No.: WO2018/127929
PCT Pub. Date: Jul. 12, 2018

(65) Prior Publication Data
US 2019/0054475 A1 Feb. 21, 2019

(30) Foreign Application Priority Data
Jan. 3, 2017 (IL) .......................................... 249923

(51) Int. Cl.
*B02C 18/22* (2006.01)
*B02C 18/00* (2006.01)
(Continued)

(52) U.S. Cl.
CPC ...... *B02C 18/0092* (2013.01); *B02C 18/0084* (2013.01); *B01J 6/008* (2013.01);
(Continued)

(58) Field of Classification Search
CPC . B02C 18/0092; B02C 18/0084; B02C 18/22; B01J 6/008; B29B 17/00;
(Continued)

(56) References Cited

U.S. PATENT DOCUMENTS 4,298,355 A * 11/1981 Staudinger ................. C10J 3/08
48/206
4,466,824 A 8/1984 Gauvin et al.
(Continued)

FOREIGN PATENT DOCUMENTS

CA 2676737 A1 12/2010
CN 101440971 A1 5/2009
(Continued)

OTHER PUBLICATIONS

Source—Merriam-Webster Apr. 10, 2019; generator—Merriam-Webster Apr. 10, 2019; filter—Merriam-Webster Apr. 10, 2019; neutralize—Merriam-Webster Apr. 10, 2019; plasma—Merriam-Webster Apr. 10, 2019; reactor—Merriam-Webster Apr. 10, 2019; purify—Merriam-Webster Apr. 10, 2019 (Year: 2019).*
(Continued)

*Primary Examiner* — Adam J Eiseman
*Assistant Examiner* — Bobby Yeonjin Kim
(74) *Attorney, Agent, or Firm* — The Roy Gross Law Firm, LLC; Roy Gross

(57) ABSTRACT

An apparatus for waste recycling that is suitable for residence building level in both volume and rate of supply of waste with a waste disposal and treatment container having the following parts: waste eliminator comprising a thermally and acoustically insulating casing with odour insulating raw waste receiving space; all-purpose shredder and crusher; crushed and/or shredded waste conveyor; liquid waste purifier; gasification plasma reactor; gas conveyor and purifier; slag collector; re-hydration means for re-hydrating solid
(Continued)

waste in the gasification plasma reactor; and safety means. Each one of these parts is organized in fluid communication with its neighbor parts.

15 Claims, 14 Drawing Sheets

(51) Int. Cl.
  C02F 1/42 (2006.01)
  B29B 17/00 (2006.01)
  F23G 5/027 (2006.01)
  B01J 6/00 (2006.01)

(52) U.S. Cl.
  CPC ............ B02C 18/22 (2013.01); B29B 17/00 (2013.01); C02F 1/42 (2013.01); C10J 2300/0946 (2013.01); F23G 5/027 (2013.01); F23G 2201/303 (2013.01)

(58) Field of Classification Search
  CPC ...... C02F 1/42; F23G 5/027; F23G 2201/303; C10B 53/00; C10J 2300/0946
  USPC ............................. 241/46.01, 46.014, 46.015
  See application file for complete search history.

(56) References Cited

U.S. PATENT DOCUMENTS

| | | | |
|---|---|---|---|
| 4,830,193 A | 5/1989 | Clayton et al. | |
| 4,831,944 A | 5/1989 | Durand et al. | |
| 4,848,250 A | 7/1989 | Wunderley | |
| 5,143,000 A | 9/1992 | Camacho | |
| 5,363,781 A | 11/1994 | Chang et al. | |
| 5,505,145 A | 4/1996 | Gross et al. | |
| 5,579,705 A * | 12/1996 | Suzuki ............... | C03B 3/00 110/185 |
| 5,615,627 A | 4/1997 | Marr, Jr. | |
| 5,657,706 A | 8/1997 | Liagre et al. | |
| 5,809,911 A * | 9/1998 | Feizollahi ........... | C10B 1/04 110/250 |
| 5,958,264 A * | 9/1999 | Tsantrizos ........... | C03B 5/005 110/250 |
| 6,045,070 A * | 4/2000 | Davenport ........... | B02C 7/04 175/206 |
| 6,653,123 B2 * | 11/2003 | Horigane ............. | B01F 7/081 241/DIG. 38 |
| 6,987,792 B2 | 1/2006 | Do et al. | |
| 7,752,983 B2 | 7/2010 | Vera | |
| 7,832,344 B2 | 11/2010 | Capote et al. | |
| 7,954,739 B2 * | 6/2011 | Shin-Ya ............... | B02C 18/0084 241/100 |
| 8,404,191 B2 * | 3/2013 | Sampson ............. | A61L 2/24 110/221 |
| 8,667,914 B2 | 3/2014 | Chapman et al. | |
| 8,690,975 B2 * | 4/2014 | Tsangaris ............ | F23G 5/50 48/61 |
| 8,957,275 B2 | 2/2015 | Stein et al. | |
| 9,321,640 B2 * | 4/2016 | Tsangaris ............ | C01B 3/22 |
| 2004/0159366 A1 | 8/2004 | Tsangaris et al. | |
| 2006/0037898 A1 * | 2/2006 | Choi .................... | A61L 11/00 210/173 |
| 2006/0144305 A1 | 7/2006 | Vera | |
| 2008/0209807 A1 * | 9/2008 | Tsangaris ............ | C10J 3/20 48/89 |
| 2009/0064581 A1 | 3/2009 | Nielsen et al. | |
| 2009/0090282 A1 | 4/2009 | Gold et al. | |
| 2009/0133407 A1 | 5/2009 | Sawyer | |
| 2010/0275823 A1 | 11/2010 | Pahls | |
| 2011/0290637 A1 | 12/2011 | Kumar et al. | |
| 2011/0296758 A1 * | 12/2011 | Lersch ................ | F23G 5/0276 48/89 |
| 2012/0061618 A1 * | 3/2012 | Santoianni .......... | C04B 28/04 252/373 |
| 2013/0012605 A1 * | 1/2013 | Zhou ................... | C10J 3/30 518/702 |
| 2013/0269252 A1 | 10/2013 | Tsangaris et al. | |
| 2013/0300121 A1 * | 11/2013 | Ali ...................... | F23G 5/0276 290/52 |
| 2013/0312424 A1 * | 11/2013 | Juranitch ............. | F23J 15/025 60/780 |
| 2013/0323132 A1 * | 12/2013 | Juranitch ............. | H05H 1/26 422/186.04 |
| 2014/0077133 A1 | 3/2014 | Krishnamurthy et al. | |
| 2014/0151343 A1 * | 6/2014 | Foret ................... | H05H 1/48 219/121.5 |
| 2015/0040565 A1 * | 2/2015 | Tan ..................... | C10J 3/00 60/682 |
| 2015/0275705 A1 * | 10/2015 | Hirson ................ | B03C 3/16 60/650 |
| 2016/0045841 A1 | 2/2016 | Kaplan et al. | |
| 2016/0146461 A1 * | 5/2016 | Lai ...................... | F23G 5/0276 60/39.465 |
| 2016/0272902 A1 * | 9/2016 | Zhang ................. | C10B 53/02 |
| 2017/0343286 A1 * | 11/2017 | Brown ................ | F27D 3/14 |
| 2017/0349434 A1 * | 12/2017 | Bank ................... | C01B 3/24 |

FOREIGN PATENT DOCUMENTS

| | | |
|---|---|---|
| CN | 102015583 A | 4/2011 |
| CN | 101468789 B | 5/2011 |
| CN | 103071666 A | 5/2013 |
| CN | 103420612 A | 12/2013 |
| CN | 204135040 U | 2/2015 |
| CN | 204294615 U | 4/2015 |
| CN | 204448783 U | 7/2015 |
| CN | 104995307 A | 10/2015 |
| CN | 105189765 A | 12/2015 |
| JP | H02306011 A | 12/1990 |
| KR | 20150112204 A | 10/2015 |
| WO | 2008044216 A1 | 4/2008 |
| WO | 2014153570 A2 | 9/2014 |
| WO | 2014201532 A1 | 12/2014 |

OTHER PUBLICATIONS

3Rsoluciones, NRG Energy Plasma Gasification MSW, https://www.youtube.com/watch?v=CBqx8t-YLrw (Year: 2012).*

* cited by examiner

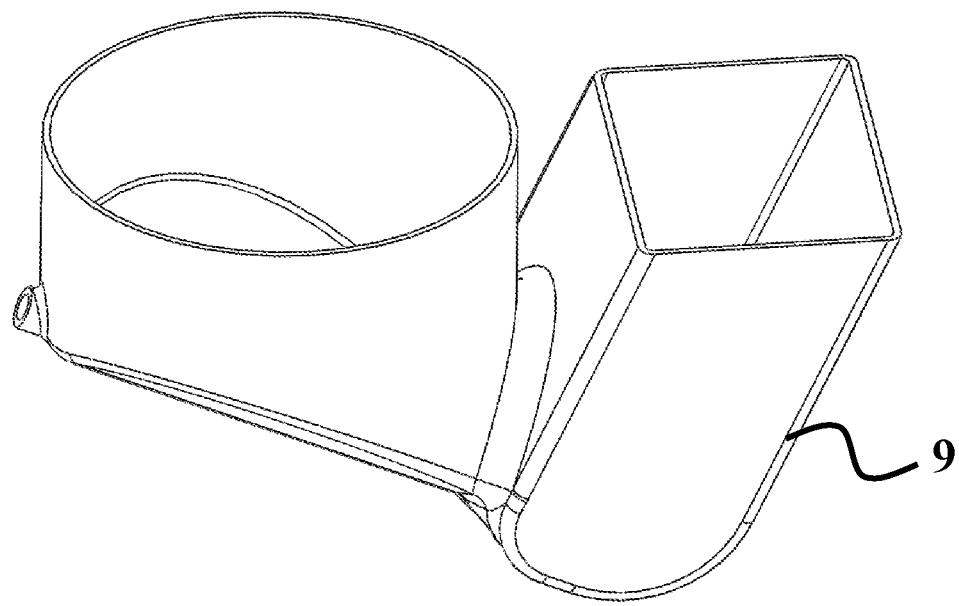
Fig. 8
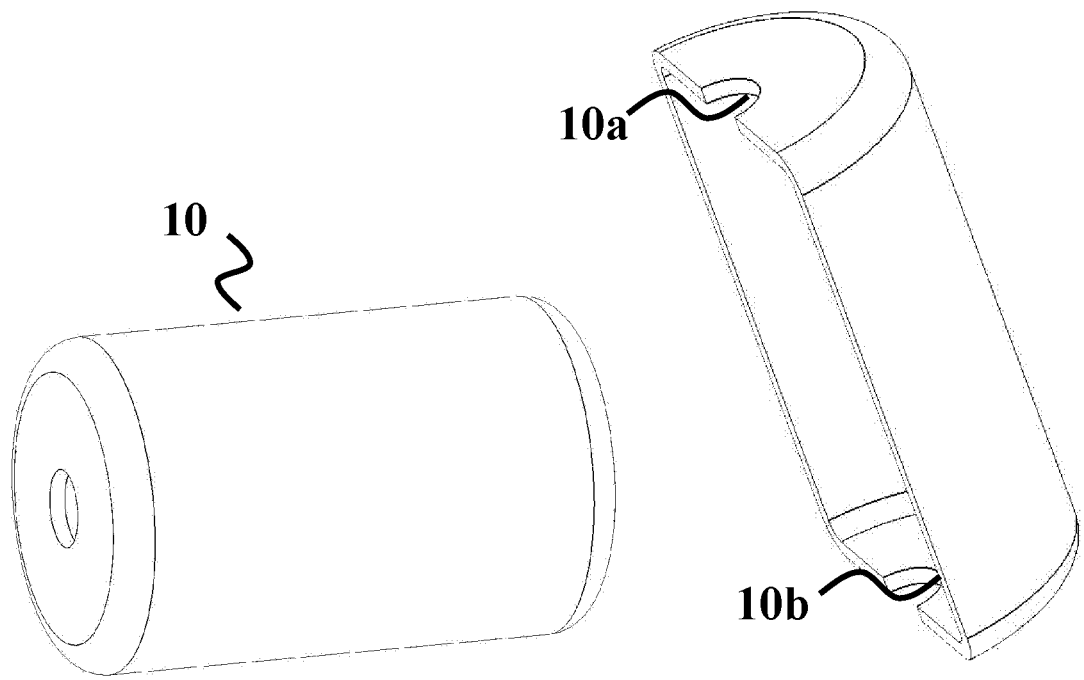
Fig. 9A
Fig. 9B

SMART WASTE CONTAINER

RELATED APPLICATIONS

This application is a National Phase of PCT Patent Application No. PCT/IL2018/050035 having International filing date of Jan. 10, 2018, which claims the benefit of priority of Israeli Patent Application No. 249923 filed on Jan. 3, 2017. The contents of the above applications are all incorporated by reference as if fully set forth herein in their entirety.

TECHNICAL FIELD

The present invention pertains to waste treatment. In particular, the present invention pertains to efficient multi-stage waste disposal on a domestic and municipal level that further produces energy such as electricity from the syngas produced.

BACKGROUND

Waste disposal and waste treatment are mostly treated with landfills for burying waste or large scale plants for waste separation, grinding, combustion, incineration and densification and various methods for producing different forms of energy, e.g., electricity and fuels. Such methods include thermal technologies for separating combustibles from non-combustibles, pyrolysis for anaerobic thermo-chemical decomposition of organic waste for producing biodiesel, gasification at sub-stoichiometric ratio between reactants and atmospheric oxygen for manufacturing Btu syngas (i.e., synthetic gas) and plasma arc gasification for the manufacturing of syngas. Accompanying operations such as transportation of the waste to the plant or landfill, the resulting traffic load and dependence on constant and continuous supply of waste to the plant reduce the total efficiency of waste treatment and disposal on municipal or state levels. Waste content collected at the municipal or state level is mixture of almost all types of waste, organic, inorganic, metallic, construction waste and so on. This further reduces yield of energy production due to excessive investment in waste separation, mixed solid product with different types of waste and combustion such as incineration, pyrolysis or plasma treatment that is less efficient.

Partial solutions for residence building level use waste compactor for downsizing waste volume for further treatment in a municipal or state waste treatment plant. This provides only partial solution due to lack of onsite recycling of the densified waste.

It is, therefore, an object of the present invention to provide onsite solution for waste recycling treatment at domestic and municipal level.

It is yet another object of the present invention to provide an apparatus for waste recycling that is suitable for residence building level in both volume and rate of supply of waste.

It is yet another object of the present invention to provide an apparatus for onsite waste recycling that is configured to provide waste recycling capabilities equivalent to those of a large scale plant at municipal and state levels.

These and other objects and embodiments of the invention shall become apparent as the description proceeds.

SUMMARY

In one aspect, the present invention provides a waste disposal and treatment container that comprises:
- waste eliminator;
- odour insulating raw waste receiving space;
- all-purpose shredder and crusher;
- crushed and/or shredded waste conveyor;
- liquid waste purifier;
- gasification plasma reactor;
- gas conveyor and purifier;
- slag collector;
- safety means; and
- means for re-hydration of the waste in the gasification plasma reactor.

In still another embodiment of the present invention, the means for re-hydration of waste in the reactor comprise:
- mechanism for steam gas or water vapor generation; and
- transporting means of said steam gas and/or water vapor into the gasification plasma reactor.

In another embodiment of the present invention, the mechanism for steam gas and/or water vapor generation, comprises steam gas and/or water vapor source and related module externally linked to the container, which generates the steam gas and water vapor using a process, such as steam generation from the plasma torch electrode cooling water system, that does not depend on the container disposal treatment of the waste or its by-products. The steam gas and water vapor are transported into the gasification plasma reactor via a single or plurality of steam gas pipes and/or via the plasma torch as a carrier plasma gas. In a further embodiment of the present invention, the waste disposal and treatment container comprise a plurality of humidity, temperature, pressure, visual and optical sensors, located inside the gasification plasma reactor in order to monitor its environmental conditions. These sensors are also used to monitor the amount of humidity inside the incoming solid waste. The data collected from the sensors are used to calculate the required amount of steam gas and water vapor to be supplied by the externally linked steam gas source.

In another embodiment of the present invention, the mechanism for steam gas and water vapor generation utilizes the by-products steam gas and water vapor, which are generated by the thermal reaction or quenching of the hot molten or vitreous slag in the bottom accumulator water container, i.e. slag collector. These steam gas and water vapor are transported into the gasification plasma reactor via a single or plurality of steam pipes, which are connected to a corresponding single or plurality of filtering breathing membranes at their interface with the gasification plasma reactor. In a further embodiment of the present invention, the single or plurality of breathing membrane elements comprise filtering means specifically configured to eliminate the entrance of undesirable by-products of the thermal reaction of the hot molten or vitreous slag quenching at the bottom accumulator water container. The membranes essentially filter the by-products and prevent them from entering into the gasification plasma reactor.

In another embodiment of the present invention, a source for steam gas generation is a process of thermal heat induced on a room temperature water flow, which is used for cooling the electrode/cathode electric arc generators, that reaches very high temperatures at work. This steam gas is in communication with the plasma torch gas supply hose and is transported into the gasification plasma reactor through the plasma torch as the carrier plasma gas, creating the "plasma jet".

In yet another embodiment of the present invention, the single or plurality of filtering breathing membrane elements are connected to corresponding single or plurality of shutters or valves, which can be operated and controlled automatically or in a manual mode. The shutters enable to increase, decrease or eliminate completely the amount of steam gas and/or water vapor flow from the bottom accumulator into the plasma reactor.

In yet another embodiment of the present invention, the disposal and treatment container comprises the externally linked steam gas source and the single or plurality of steam gas pipes which are connected to corresponding single or plurality of filtering breathing membranes at their interface with the gasification plasma reactor. In this case, the required humidity gap level to the target is filled by the externally linked steam gas source. The externally linked steam gas source completes the required steam gas and water vapor amounts in order to stabilize, restart and maintain humidity levels and conditions in the gasification plasma reactor during all its possible states. Such states may be idle, cleaning, processing, process completion and pre- and post-processing states.

In yet another embodiment of the present invention, the disposal and treatment container comprises a plurality of humidity, temperature, pressure, visual and optical sensors, which are located inside the gasification plasma reactor in order to monitor its environmental conditions and levels of humidity within the incoming solid waste. The data collected from these sensors yield the required amount of additional stem gas and water vapor, which are required to be supplied by the externally linked steam gas source, considering as well the level of the steam gas which is supplied by the internal steam gas source.

In another embodiment of the present invention, the bottom accumulator can be filled with cold water, a mixture of ice and water phases or a complete icy phase. In these cases, the water temperature can be below the external environmental temperature, close to the water freezing temperature or below it.

In another embodiment of the present invention, the waste disposal and treatment container further comprises a piston element, which is added to the gasification plasma reactor at its top side. This piston has two major operational states: a first state in which the piston is in its fully retracted position with respect to the gasification plasma reactor, and is used to separate the gases outlet from the solid waste upper inlet. A second state of the piston is in which the piston is fully inserted inside the plasma reactor, reaching its outlet at its bottom side. Along the transition from the first to the second states, the piston mechanically cleans the soot residues from the gasification plasma reactor side walls, where when it reaches the second state it removes slag from the reactor bottom outlet and further pushes it out into the bottom accumulator container, i.e. slag collector. In a further embodiment of the present invention, the waste disposal and treatment container further comprises a plurality of optical, temperature, pressure, humidity, and any other environment-related sensors, which are located inside or outside the gasification plasma reactor. The reactor may also be monitored with visual monitors that image the chamber condition and compare it to its normal condition. The self-cleaning maintenance procedure can be executed automatically by the piston and supervised by the monitors. Alternatively or additionally, it can be executed on a time or processing time on a periodic or non-periodic basis. In a third option, cleaning the reactor can be executed at the beginning or end of a waste gasification session, or manually executed by an operating user.

In one aspect, the present invention provides apparatus and method for waste disposal and treatment for a building residence. The apparatus comprises a downsized, compacted, small scale configuration that retains capabilities and functionalities used in a large scale waste treatment plant and that is configured to synchronize with the waste disposal regime accustomed in the residence building.

In still another aspect, the present invention provides waste disposal and treatment plant for a residence building with the following major components: Waste eliminator; Odour insulating raw waste receiving space; All-purpose shredder and crusher; Lipid separator, Liquid waste purifier; Gasification reactor; Gas conveyor and purifier; Energy generator; Slag collector and Control & Safety means.

These components may be implemented in different ways on a small scale level all of which are particularly designed to fit within a small scale container that is configured for onsite waste treatment in a building residence. The small scaling of these components poses limits on their effective size and arrangement in the container one relative to the other. These components form a continuous line of treatment within the container. Accordingly, their configuration within the container should meet size limitations and interface requirements between them to fulfil the desired functionalities of the apparatus.

Table 1 below lists the alternatives available for the waste disposal and treatment apparatus of the present invention and the requirements from every component that are configured to be accommodated and operate within the container.

TABLE I

| System | Sub-system | Optional Technological Solution |
| --- | --- | --- |
| Waste Eliminator | Thermally and acoustically insulating casing (container) that is adapted to municipal requirements | Metal, plastic or composite material wall<br>Thermo-acoustic insulation<br>Standalone facility with appropriate geometry/coupling interface with waste disposal facilities, shafts, and pneumatic systems |
| | Inlet-Outlet | Waste inlet<br>Power cable in/out<br>Input/output data cables/wireless communication<br>Electrical Grounding<br>Gas inlet/outlet<br>Water inlet/outlet<br>Slag outlet/detachable slag container<br>Maintenance access window |

TABLE I-continued

| System | Sub-system | Optional Technological Solution |
|---|---|---|
| | Control panel | Touch screen |
| | | Dedicated computer |
| | | Continuous with system casing |
| | | Rails adapted for forklift |
| | | Thin with matching geometry to casing |
| | | Metal, plastic or composite material |
| | | Optional: Anchoring to fixed surface |
| Odour insulating raw waste receiving space | Upper anchor Safety sealed door | Lifting handle on casing roof Hinge Sliding rail Automatic opening Safety electro-mechanic mechanism. * Electric/manual |
| | Active odour neutralizer | Ozone generator Active carbon filter Chemical reaction filtering |
| All-purpose shredder and crusher | Shredder | Single/multi stages Crushing hammers |
| | Shredder | Single/multi stages Crushing hammers |
| All-purpose shredder and crusher | Shredded waste accumulator/buffer | Pre-conveying storage box |
| | Waste conveying system | Linear shaft Spiral screw Peristaltic pump Conveyor belt Flexible conveying tubes |
| Waste liquid purification | Reactor feeding mouthpiece | One-way valve Linear shaft Spiral screw |
| | Filters, liquid purifiers | Micron filter Active carbon Lipid separator Reverse osmosis system |
| | Reclaiming lipid and concentrated contaminant fluid to gasification/reactor | Inert tubing Pump Shaft |
| Reactor: metal/ceramic insulating container/plasma gasification furnace or other heating methods | Internal heating system | Electrical and chemical energy, applying plasma electrodes or microwave Power control with temperature Optimal location of point of heating and entrance angle into inner space Optimal heat conduction within container and incoming waste for even external and internal temperature distribution, maximal energetic efficiency through gasification and safety demand. Controlled oxygen diffusion and water gas/steam for chemical reaction |
| | Internal heating system | Electrical and chemical energy, applying plasma electrodes or microwave Power control with temperature Optimal location of point of heating and entrance angle into inner space |
| | Internal heating system | Optimal location of point of heating and entrance angle into inner space |
| Reactor: metal/ceramic insulating container/plasma gasification furnace or other heating methods | Internal heating system | Optimal heat conduction within container and incoming waste for even external and internal temperature distribution, maximal energetic efficiency through gasification and safety demand. Controlled oxygen diffusion and water gas/steam for chemical reaction |

TABLE I-continued

| System | Sub-system | Optional Technological Solution |
|---|---|---|
| | Thermal insulation | Double side sandwich wall with intermediate locked air<br>Ceramic coating<br>Reflective heat induction insulating inner coating<br>External insulation (e.g., mineral wool) |
| Reactor: metal/ceramic insulating container/plasma gasification furnace or other heating methods | Temperature-pressure control | Active digital control<br>Active analogue control (e.g., thermocouples, thermostats)<br>Temperature monitor for reactor inner and outer sides<br>Inner pressure monitor<br>IOT - data transmission communication |
| | Design | Specified size and structure design for: maximal physical size; function adapted geometry; insulation - oxygen diffusion control |
| | Slag outlet | Dedicated outlet at bottom of reactor, in vicinity of energy source for sustaining high work temperature and slag/metal liquid phase<br>Supplemental outlet for metal disposal |
| | Slag solids mechanical disposal system | Slag sheering/crushing in outer surface surrounding for preventing outlet plugging - automatic actions of sweeping/disc rotation/hammer drill/extraction pin |
| | Gas release outlet | Gas product output (hydrogen, syngas) to purification:<br>Filtering net<br>one-way valve, over-pressure off-loading |
| Reactor: metal/ceramic insulating container/plasma gasification furnace or other heating methods | Heat generator: Plasma arc/microwave/etc | Electrode - Cathode electric arc<br>Microwave system<br>Other Heating means |
| Gas purification and conveying | Integrated gas conveyor | Piping, parts, high pressure resistant gaskets, e.g., for high pressure hydrogen gas |
| | Gas purification | Catalytic converter<br>Plasma flame for toxin decomposition<br>Quenching with heat exchanger<br>Micron filter<br>Active carbon filter |
| Gas purification and conveying | Clearing and reclaiming excess material, toxic gas products, contaminated carbon dust to reactor | Piping<br>Pump<br>Valves |
| | Gas accumulator | Compressor<br>Hydrogen gas suitable container (volume/pressure ratio)<br>Controlled pressure reducing valve to energy feed |
| Slag collecting | Receiving cooling container for hot slag in viscous/liquid state | Dedicated geometry for:<br>Insulation, air-tight encapsulation to reactor with upper dam dipped in water;<br>Receiving, cooling and quenching hot molten slag fallen into water for following expelling;<br>Drainage and refilling openings for continuous cooling and/or replacing cooling water |

TABLE I-continued

| System | Sub-system | Optional Technological Solution |
|---|---|---|
| | Slag bulk collection and packing | Filter spoon rail cool for slag bulk sweeping from bottom of water quenching container<br>Inner or outer slag dedicated container for slag bulks<br>Indication for full or over-flow of slag bulks in the container |
| Energy conversion/production | Power production | Fuel cells - electrolytic process with hydrogen and oxygen<br>Mini turbo generator<br>Generating steam for steam turbine<br>Current stabilizer/rectifier<br>Control system<br>Domestic/local power supply<br>Connection to grid<br>IoT for data transmission |
| Energy conversion/production | Heat discharge/exchange for local heating | Heating water of local heating with cooling turbine and complementing systems<br>Heating water for local heating with controlled burning of produced gas, e.g., hydrogen, syngas |
| Humidity Production/re-hydration of solid waste in reactor | Water vapor/steam gas generation and introduction into reactor | Externally linked water vapor/steam generator<br>In-line water vapor/steam generator from slag collector and/or from plasma torch electrode cooling system<br>Piping, filtering, shuttering, controlling, monitoring and scheduling components for transporting water vapor/steam gas into the reactor and/or steam water through plasma torch, as a carrier ionic gas of the electric arc |
| Safety | Online monitoring<br>Real-time system safety evaluation<br>Periodic safety check (BIT)<br>System check on starting (PBIT)<br>System software test<br>System control test<br>Smart user interface | |
| Safety | Online monitoring<br>Real-time system safety evaluation<br>Periodic safety check (BIT)<br>System check on starting (PBIT)<br>System software test<br>System control test<br>Smart user interface | |

The different options for the sub-systems in table 1 provide various optional assemblies for onsite waste treatment in a compact container. In general, every assembly comprises the sub-systems that are listed under the appropriate system, where the technical and technological solutions characterize the sub-system and may all or in part be selected from those listed for each sub-system. For example, the casing or container of the apparatus is thermally and acoustically insulating and adapted to the requirements of any facility that produces waste of type, volume and mass which is manageable onsite. In particular, the casing of the container is adapted to thermal and acoustic requirements of residence buildings. Such insulation may be obtained with appropriate metal, plastic or composite materials for the walls of the container, thermo-acoustic insulation and any combination thereof. The container may be a standalone facility or a facility that may be coupled with other waste disposal facilities, shafts and/or pneumatic systems for waste transportation. Alternatively, the container may comprise both the standalone and coupling options for versatile use according to the waste transportation and treatment equipment in different waste producing facilities, for example residence buildings. The container itself should have inlets and outlets for input of work material and output of products and by-products. These comprise, waste insertion inlet, power input, wire or wireless data input, ground, gas inlet and outlet, inlet and outlet for water reclaimed from the waste mass, outlet for slag formed in the shredding, crushing and densification of waste mass after removal of liquid phase. The waste insertion inlet may be located in any place on the container that is suitable for feeding waste to the first station in the assembly for further processing. The slag outlet may be continuous with detachable slag container. In addition, a window in the casing wall is provided for manual action, supervising and ventilation. An outlet for transporting the gas produced in the process of waste transformation, e.g., syngas or hydrogen gas, may also be provided for communicating the gas to energy producing unit that is in fluid communication with the unit of the apparatus that produces the gas.

Computer control panel for monitoring, operating and controlling waste treatment within the container is also contemplated within the scope of the apparatus of the present invention. This may be implemented with touch screen, and dedicated computer and app that is stored and operative on the computer. In an alternative, remote wireless control is provided through cell phone or tablet with wireless communication means for communicating with the dedicated computer. Wireless remote communication may be provided with WLAN (Wireless Local Area Network), WAN (Wide Area Network), cellular network or the internet through a cloud-based server.

Physical means for handling the container within a site or between sites are lifting means such as an anchor on the container roof and a floor ramp with rails in its outer side for coupling with a forklift. The geometry of the ramp should match that of the casing and may be made of materials selected from metals, synthetic materials, composite materials and any combination thereof with load capacity that is at least sufficient to carry the container with or without waste contend. In one embodiment, the ramp comprises means for fixing it to the floor of the garbage room in which the container is placed.

Organic waste produces unpleasant odour that should also be contained within a defined volume and treated without spreading away to the surroundings. Therefore, in one embodiment, the container comprises an odour insulating space that receives the waste mass and comprises safety sealed door and means for neutralizing the odour. The closing and opening mechanism of the door may be a hinge, sliding rail or automatic opening. In either one of these alternatives, the door may be automatically or manually opened. The odour neutralizing means may be selected from ozone generator for oxidizing the odour molecules, active carbon for receiving and filtering the waste mass and trapping bad odour molecules within, chemically reactive filter for reacting with bad odour molecules and releasing odourless products and any combination thereof.

One of the first actions in waste treatment is shredding and crushing the waste mass for further phase separation, combustion, incineration and/or any other following stages. Accordingly, in one embodiment, an all-purpose shredder and crusher is provided and configured to be contained and operative within the container of the present invention. The relevant sub-systems may comprise single- or multi-stage shredding means and/or crushing hammers. Liquid filtering and drainage accompanies the shredding and crushing actions, where liquids are extracted from the waste mass. Filtering and liquid-solid phase separation may be carried out with compressing or pressing means of the waste mass into the filter or sweeping the mass on a grid and letting the liquid phase drain down. The shredder system may also comprise waste conveyor for leading the solid mass forward. This may be done with linear shafts pushing the mass forward, turbinate screw, peristaltic pump, conveyor belt or flexible conveying tubes. The solid component of the crushed and/or shredded waste moves to a conveyor that leads it to a gasifier/reactor. To prevent the conveyor from plugging by the solid waste, a waste accumulator/buffer may be installed between the crusher/shredder and the conveyor. The accumulator/buffer may be provided as a storage box that stores solid crushed/shredded waste for feeding to the conveyor and adapting the speed of crushing/shredding to the speed of conveying the waste further in the conveyor. Purification of the extracted liquids follows from the previous shredding and crushing of the waste mass that is transported to the next stop in the apparatus. The extracted liquids are collected and fed into a purifier through reactor feeding mouthpiece that may be selected from one-way valve, linear shaft and a turbinate screw. The liquid exudates comprise aqueous and organic liquid phases and solid contaminants, for example in the form of suspensions, floating particulates, colloids or precipitates within the liquids. In one embodiment, lipid-water phase separation takes place in a lipid separator for extracting organic phase from the aqueous phase. Reverse osmosis may then follow for releasing minerals off of the aqueous phase. After phase separation and solids filtering, the concentrated contaminated fluid is returned for further processing in a gasifier or plasma reactor for producing oil or gas for electricity, respectively. Reclaiming of lipids and contaminated fluid may be done with any one of tubing that is chemically inert to the fluids it transports, a pump and shaft for streaming the fluid to the gasifier or plasma reactor for further processing.

The gasifier or reactor is the central part of the apparatus of the present invention that processes the condensed solid waste and concentrated organic and contaminated fluids to produce energy, i.e., electricity, or products that are useful for producing energy such as oil liquids. Internal heating of the reactor or gasifier may be provided with electrical source and/or through exothermic chemical reactions. These heat sources may be generated with plasma electrodes or microwave generator. Power control means is controlled and regulated with temperature indication when preset temperature is reached. Further, the internal configuration of the heating means, plasma electrodes or microwave generator, is so designed for most efficient heating of the processed waste mass. For this, maximal heat conduction is obtained with optimal location of the heating source and its angle relative to the processed mass within the reactor or furnace. Further, maximal energetic efficiency during the gasification stages may be obtained with optimal heat distribution within the gasifier, reactor or furnace. The waste mass is then processed with lowest energy investment possible, however together with maintaining safety demands. In assemblies where aerobic conditions are allowed, controlled oxygen diffusion is provided for assisting the chemical reaction that takes place.

For any one of the thermal treatment devices, gasifier, plasma reactor or furnace, thermal insulation may be provided. In particular, such insulation may comprise double side wall with vacuum or air space between the two sides. Still another option is ceramic coating insulation. Another option for insulation is Calcium silicate combined with metal. Reflective coating may be applied on the inner side of the wall to prevent radiation of heat out the surroundings, thus increasing heating efficiency. In still another option, external insulation such as mineral wool may be used to preserve the heat within the reactor for maximal energetic efficiency.

Temperature and pressure control system may be in communication with appropriate temperature and pressure sensors within the reactor. In particular, digital or analogue sensing and control means may be applied, manometers, thermocouples and thermostats used in direct connection with a power source being examples of the analogue temperature sensing and control means. Regardless of the type of pressure and temperature controllers, temperature and pressure monitor may be attached to the outer and inner sides of the reactor walls. Pressure monitor may be placed within the reactor. Both temperature and pressure sensors are in direct communication with data processing and display means, for example through IoT (Internet of Things) network for data transmission and display.

The final processed and condensed waste mass is turned to slag, which is then released out, for example through dedicated outlet at the bottom of the reactor. Plasma or microwave generator may be used to form the slag, although any other heating means may be applied in the apparatus of the present invention. Preferably, the slag outlet is located near the energy source that feeds the reactor to maintain liquid phase of the slag or metallic waste left after processing the organic part of the waste. Secondary outlet for metallic waste disposal may also be provided. The slag solidifies under cooling conditions of the surroundings and might cause plugging of the outlet. Therefore, in one particular embodiment, slag sheering or crushing means are provided for preventing outlet plugging using any one or combination of sweeping shaft, cutting disc, drill hammer and extraction pin. Slag bulk collection and packing follows after slag processing. To prevent plugging due to accumulation of slag, indication means are provided to warn against full or over-flow of slag bulks in the container.

Gas outlet to further gas purification system may also be provided for product gases such as syngas and hydrogen gas. One-way valve may be provided for release of excess pressure.

Structure and configuration design of the reactor should meet certain requirements as follows: maximal physical size, dedicated geometry and insulation to surrounding air. This way control of oxygen diffusion is obtained.

The second product of waste processing in the apparatus of the present invention is gas purifier and conveyor. Such conveyor may comprise proper piping, parts accessories and high pressure resistant gaskets that are required for high pressure gas, such as hydrogen gas. The purifier may comprise the following components to purify the gas that leaves the reactor for further production of electricity: catalytic converter for decomposing contaminants, plasma torches for decomposing toxic materials, heat exchanger for quenching hot gas, micron size filter for trapping airborne residues swept with the gas and/or active carbon filter for passing the gas through and filtering airborne solid residues.

Optimization of waste treatment may be achieved by reclaiming excess products, toxic gases and contaminated char back to the reactor for further processing. The advantage is three fold. First, the produced gas is released to the power generator. Second, the residues are further treated for energy and/or fuel production. Third, the environment benefits by minimizing and containing the by-products of the waste treatment. Conventional tubing that comprises piping, pumps and valves may be used to implement the reclaiming of residues and clearing the out-flowing gas.

For the processing of the cleared gas for electricity, gas accumulator may be in fluid communication with the reactor gas outlet. Such gas accumulator may comprise a compressor for condensing the gas, suitable container with proper volume/pressure ratio particularly for safely containing hydrogen gas and controlled pressure reducing valve for controlling gas feed to energy production reactor.

As briefly mentioned above, slag collection is done in one of the final stages of waste treatment in the apparatus of the present invention. Main components of the slag collector comprise a container for receiving and cooling it in viscous or liquid states, and means for packing and compacting the solid slag in a dedicated packing. Indication means for full or over-flow of slag bulks in the container is provided to control the packing process of the solid slag. The cooling container may be provided in dedicated geometry for insulation and air-tight encapsulation with upper water dam that traps air, i.e., oxygen, means for receiving, cooling and solidifying hot liquid slag in water using water medium for gravitational fall of slag bulks for further removal. Drainage and filling openings are provided for continuous cooling and/or replacing cooling water. Collecting and packing slag bulks may be carried out with filter spoon rail for transporting and sweeping them from the bottom of the quenching container. Alternatively, the slag bulks may be poured to dedicated drawer or reservoir within the container or outside of it.

Energy production is a benefit that evolves from this type of waste treatment. In particular, power production may be obtained by communicating the waste treatment products to different power generating units such as fuel cells and mini turbo generator. Current stabilizer/rectifier, control system, wiring for local/domestic consumer, output to mains and connection with IoT data communication means are also contemplated as accompanying components for the power generators. The heat released from the waste treatment in the apparatus may further be harnessed for positive use. For example, heat discharge and/or exchange may be carried out in communication with water heating system of a residence building, office building plant or facility using cooling turbine and complementing systems. Heating of water of a local heating may also be done with controlled burning of produced gas, syngas or hydrogen. Otherwise, a heat exchanger may be used for forced convection of heated air to the surrounding for expelling excessive heat from the apparatus. In another particular embodiment, heat discharge and/or exchange may be communicated with cold or ambient air for obtaining largest possible temperature difference between the incoming cold/ambient air and outgoing hotter air. The greater the temperature difference is the more efficient is the production of energy, for example mechanical energy in a turbine, and accordingly the amount of electricity produced.

Finally, safety means are applied to the apparatus of the present invention comprising online monitoring digital means, real-time safety evaluation, periodic safety check (BIT), system check on starting (PBIT), system software testing and system control testing.

In one particular embodiment, the present invention provides a small domestic container (optimized to treat MSW (Municipal Solid Waste) of residential building, farm, factory or small neighbourhood) that enables the transformation of waste to slag, reducing its volume significantly, while producing energy and water for irrigation as a by-product. In still another particular embodiment, the container comprises six main sub-units: shredding unit, drying and compression unit, plasma treatment unit, water treatment unit and energy production unit. The shredding unit handles all types of household waste, comprising solids, plastic and organic waste. The drying and compression unit treats liquid waste to the point where irrigation quality water is obtained. The plasma treatment unit converts waste to gas and accrual in a dedicated container. The energy unit converts the gas into electricity and environmentally clean gas.

In still another particular embodiment, the apparatus of the present invention is a small robotic container that collects and converts household waste into gas and slag, without using fire in the process. For example, its periodic capacity reaches up to 500 kg of waste in daily rate in a residential building, and provides central waste management using the e-Waste (IoT) technology.

The following describes particular configuration of the apparatus of the present invention with reference to the accompanying drawings without limiting the broadest scope of the present invention.

BRIEF DESCRIPTION OF THE DRAWINGS

FIGS. 4-16 illustrate the different parts of the apparatus exemplified in FIGS. 2-3.

Further detailed description of the particular configuration as illustrated in FIGS. 1-16 is provided below.

DETAILED DESCRIPTION OF THE DRAWINGS

Figure 1:
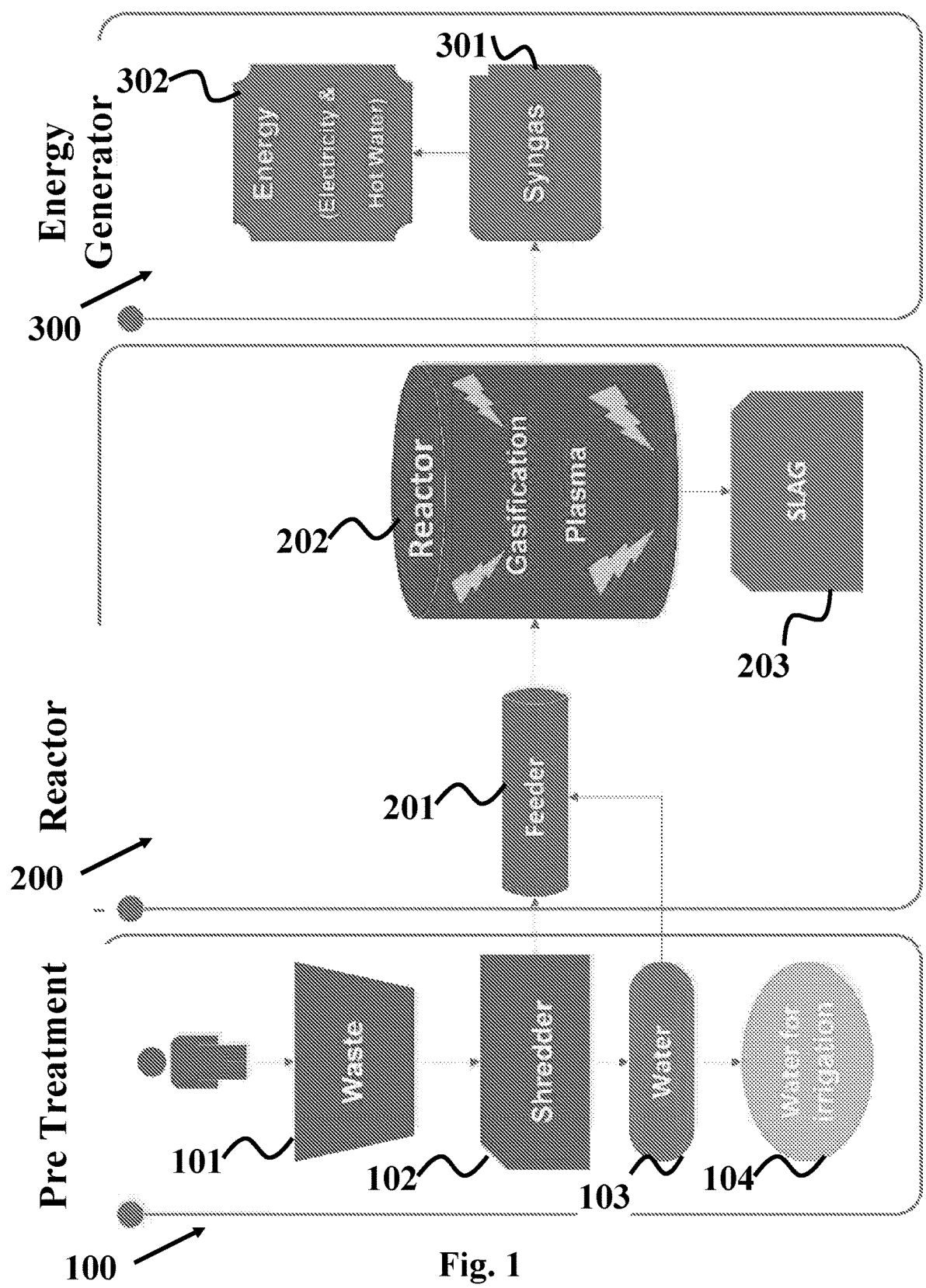
FIG. 1 is a schematic representation of the general divisions of the apparatus of the present invention.

FIG. 1 provides schematic view of the major stages and detailed steps of the small scale waste treatment plant of the present invention. Pre-treatment of waste (100) disposed in a residential building comprises initial steps of receiving the waste (101) shredding and crushing it (102), extracting the liquids (103) and purifying them to irrigation grade water (104). Eventually the water is drained out to a purified water container or proper piping in fluid communication with the container. After disposing of the liquid phase, the solid phase waste is transported to the reactor (200), for example, plasma reactor, for decomposition and transformation to syngas and/or release of hydrogen gas. The solid waste is fed to the reactor (202) with a feeder (201), where it goes physical and/or chemical reactions at elevated temperature depending on the type of reactor. The solid slag (203) is released from the reactor (203) as by-product and transported for packing and disposal. The next step is generation of energy (300), where the syngas or hydrogen gas (301) which are released are channeled to an energy generator (302) for producing electricity that may be fed back to the mains, partly back to the plant or directly to the residential building electricity system for local use.

Figure 2:
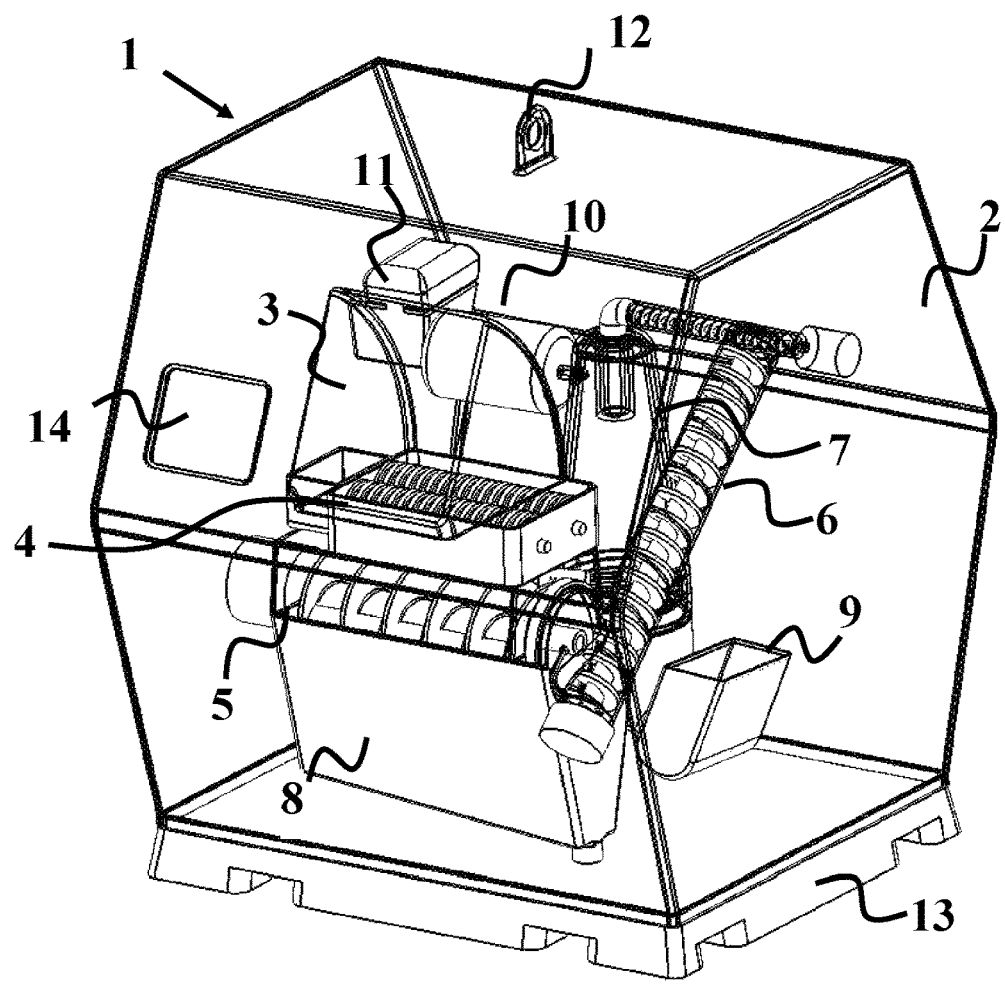
FIG. 2 illustrates a waste treatment apparatus of the present invention.
Figure 3:
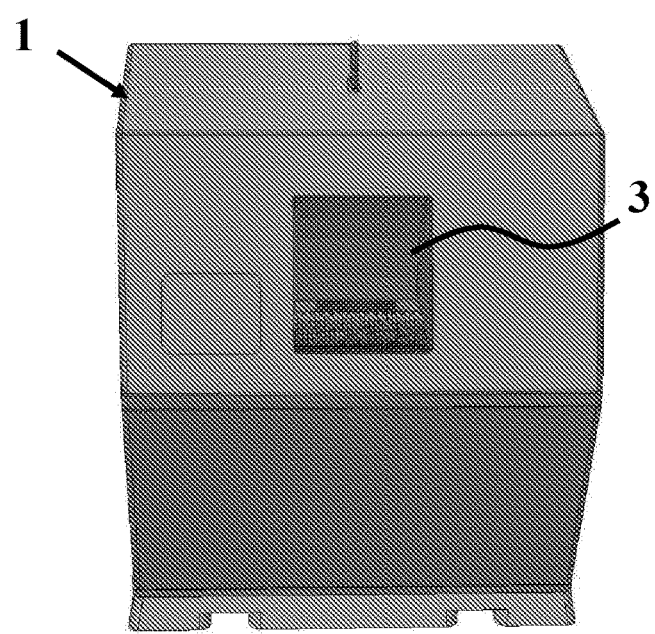
FIG. 3 illustrates a perspective solid view of the container of the apparatus of the present invention.
Figure 14:
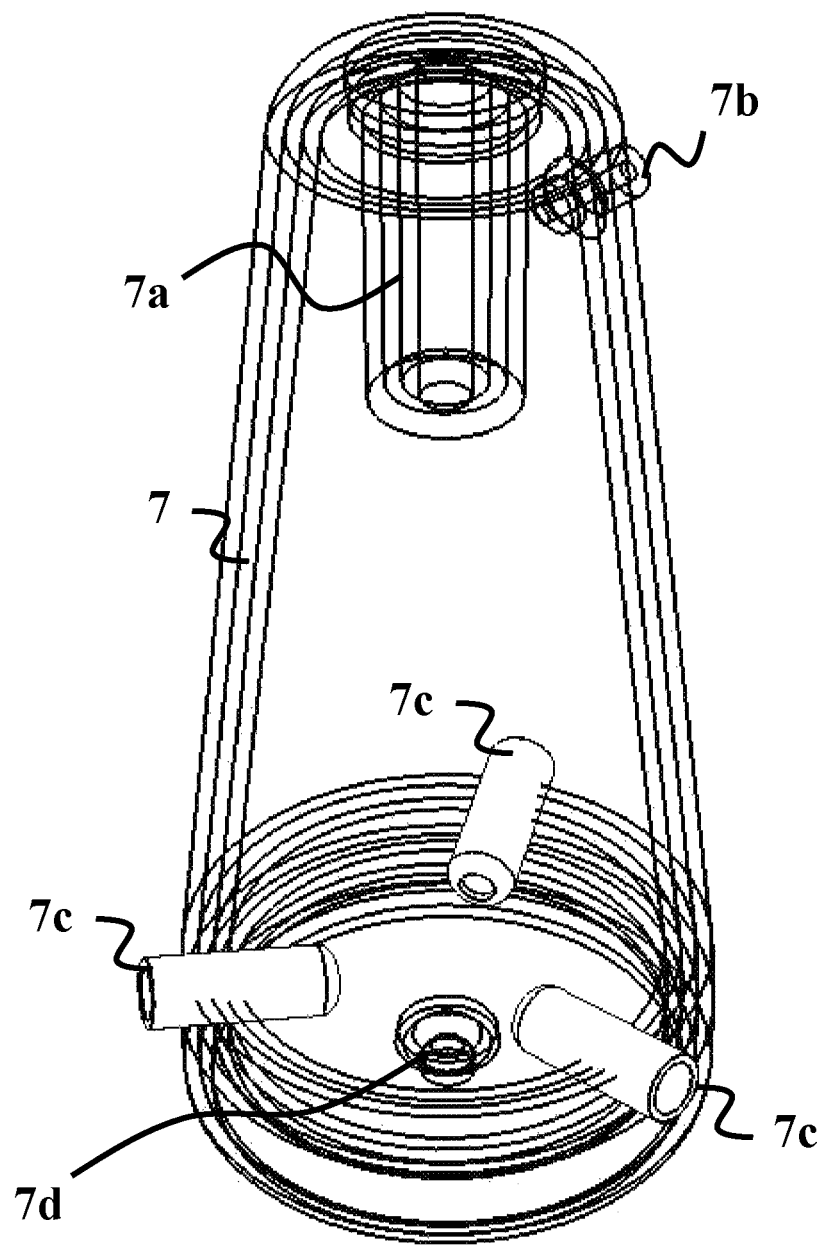
Figure 15:
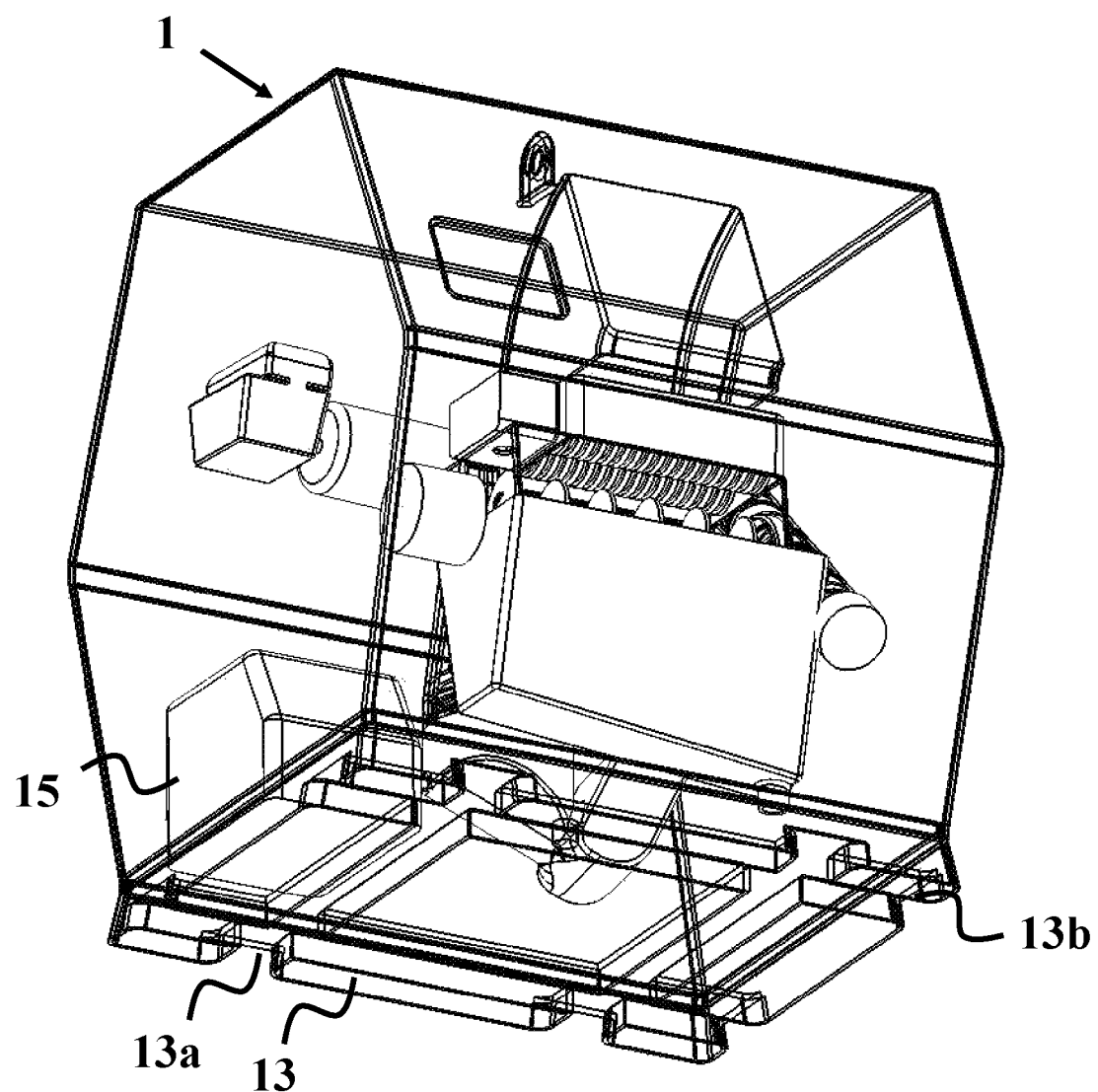

FIGS. 2, 3 and 15 illustrate a particular shape and configuration of the container (1). A container (1) contains an assembly of devices organized in a casing (2) for treating waste in a particular series configuration. Entrance for waste (3) is more clearly displayed in FIG. 3 directly above a shredder (4), so that incoming waste is fed into the shredder first, crushed, grinded and transported with a revolving grainer screw (5) followed by diagonally upward positioned turbinate screw (6) for decomposition in a reactor (7). Liquid phase trapped within the incoming waste is released and drained to a liquid container (8) below the shredder (4) with sufficient volume and proper shape (8a in FIG. 4), where it is further purified, separating organic from aqueous phases, recycling the organic phase back to the plant and releasing irrigation grade water out through a bottom outlet (8b in FIG. 4). The condensed solid waste travels up the turbinate screw (6) and fed through an upper inlet (7a in FIG. 14) of the plasma reactor (7). Three plasma torches (7c in FIG. 14) at the bottom of the reactor (7) release very high temperature plasma that decomposes the incoming solid waste. A molten or vitreous slag falls to the reactor floor and is swept out through lower outlet (7d in FIG. 14) to a bottom accumulator (8) which is filled with water. The syngas or hydrogen gas produced from the waste in the plasma reactor (7) is fed to a gas purifier (10), which is located near the reactor (7) and in fluid communication with the reactor (7) through gas outlet (7b in FIG. 14). The gas purifier (10) traps and filters out airborne solid contaminants and passes the purified gas to an energy generator (11) for producing energy such as electricity. The energy produced may charge partly the plant itself, local power consuming devices or fed back to the mains.

In one preferred embodiment of the present invention, re-hydration of the solid waste in the reactor (7) is done with a steam gas and/or water vapour injected into the gasification plasma reactor (7). An injection of supplemental amount of steam gas and water vapor into the gasification plasma reactor (7), especially at the proximity of the plasma sources electrodes, moderates and improves its environmental conditions. Moreover, adding a sufficient amount of humidity to the plasma reactor enhances and improves the decomposition process of the solid waste into slag material and the production of syngas or hydrogen gas from the solid waste material.

Figure 17A:
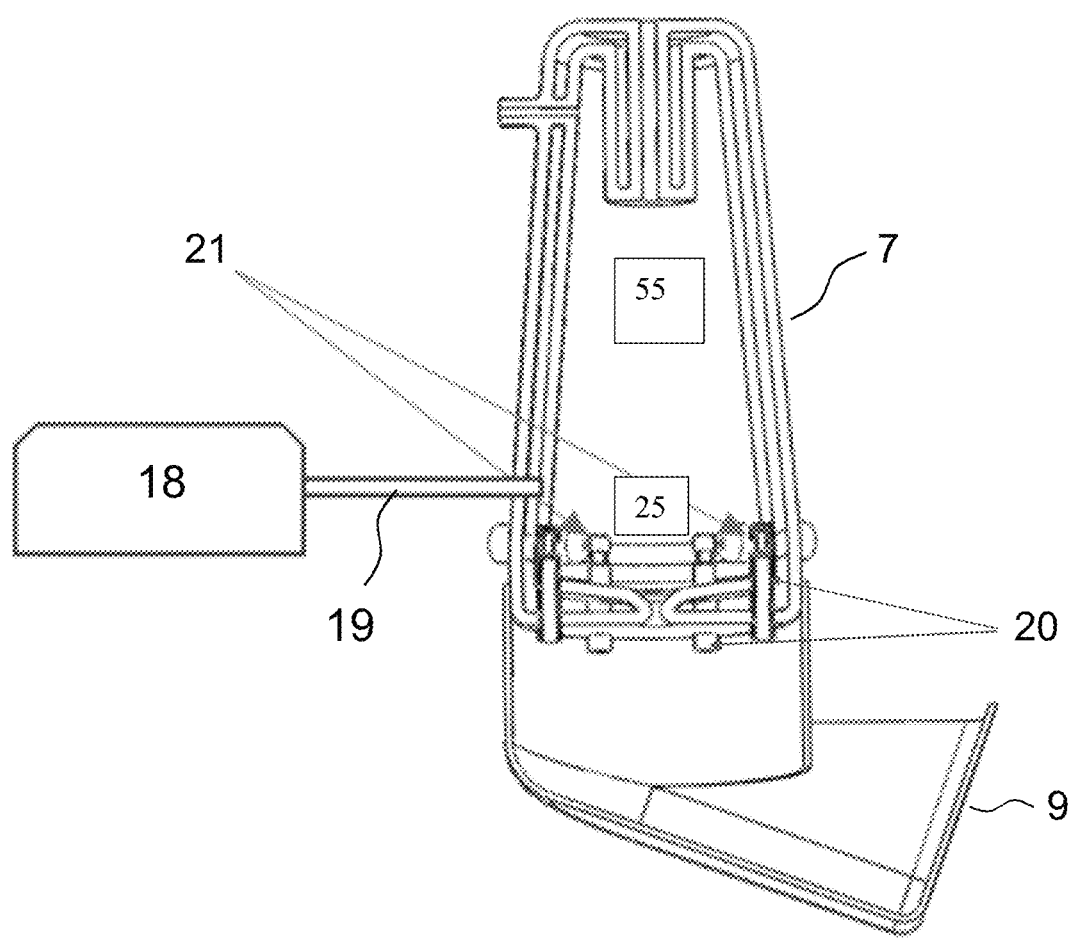
FIG. 17A illustrates a cross sectional view of the internal design and assembly of the plasma reactor, the bottom accumulator and the separated steam gas source.
Figure 17B:
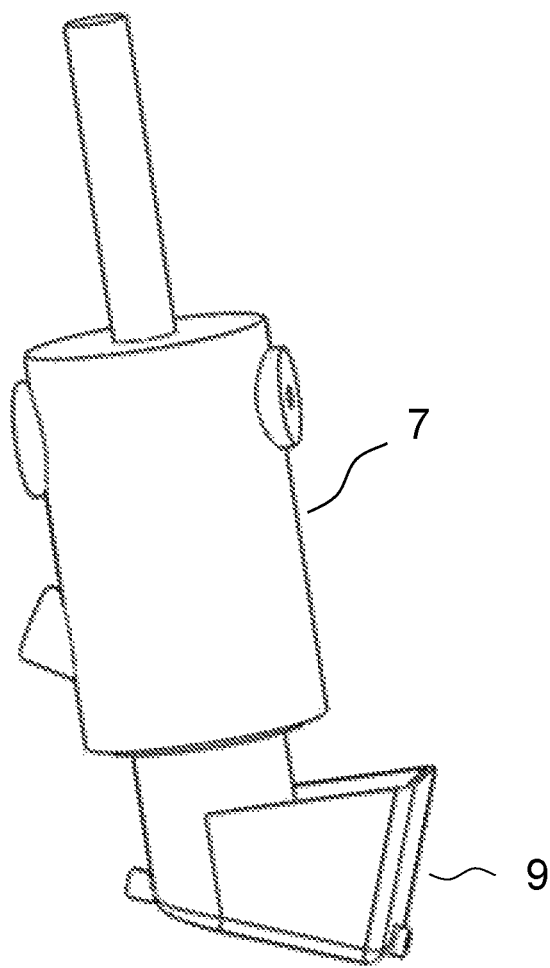
FIG. 17B illustrates a perspective side view of optional design and assembly shown in FIG. 17A.

FIG. 17A illustrates a cross sectional view of the internal configuration and assembly of the plasma reactor (7), the solid accumulator (9) and a steam gas source (18), in one preferred embodiment of the present invention. FIG. 17B illustrates a perspective side view of optional design and assembly of the gasification plasma reactor (7) and the solid accumulator (9) shown in FIG. 17A. The steam gas and water vapor source (6) comprises a module that generates a steam gas and water vapor using a separated process that does not depend on the container disposal treatment of the waste or on its by-products. In this assembly, the steam gas source (18) is connected to the gasification plasma reactor (7) through a single or plurality of steam gas pipes (19), enabling the injection of the steam gas and/or water vapor into the plasma reactor during the decomposition process of the solid waste into slag material and syngas with the plasma torches (7c). In a further embodiment of the present invention a plurality of humidity, temperature, pressure, optical and visual sensors (55) are positioned inside the plasma reactor (7) in order to monitor its environmental conditions. These sensors (55) are also used to monitor the amount of humidity inside the incoming solid waste. The data accumulated from the monitors is fed into the steam source control unit and used to calculate the required amount of steam gas and water vapor, which is required to be supplied by the steam gas source (18).

In another embodiment of the present invention, a single or plurality of steam gas pipes (20) are connected to corresponding single or plurality of filtering breathing membranes (21) at their interface with the gasification plasma reactor. These pipes (20) connect the bottom accumulator (8) to the gasification plasma reactor (7). Such configuration enables to utilize the steam gas and water vapor by-products, which are generated by the thermal reaction, i.e., quenching, of the hot molten or vitreous slag when immersed at the bottom accumulator water container (8). In a further embodiment of the present invention, the single or plurality of breathing membrane elements (21) comprise additional filtering means especially configured to eliminate or reduce entrance of undesirable by-products into the gasification plasma reactor (7), contaminating it and degrading its operational performance. This configuration results in an effective internal steam gas source that generates the steam gas injecting it through steam gas pipes (20) and the corresponding plurality of filtering breathing membranes (21) into the gasification plasma reactor (7). Properly using this system significantly improves the efficiency of plasma decomposition of the solid waste material into slag material and syngas or hydrogen gas from the solid waste material. In a further embodiment of the present invention, the single or plurality of filtering breathing membranes (21) are connected to corresponding single or plurality of shutters or valves (25) that can be operated in automatic or in manual mode. The shutters or valves (25) enable to control increase, decrease or complete elimination of the flow of the steam gas from the solid accumulator chamber (9) into the gasification plasma reactor (7).

In another embodiment of the present invention, the steam gas source (18) and the single or plurality of steam gas pipes (20) are part of the gasification plasma reactor system. The steam gas external source (18) is used to stabilize, restart and maintain humidity conditions and levels inside the gasification plasma reactor during all of its possible states, such as idle, cleaning, processing, process completion and pre- and post-processing states. In all these steps, the required humidity gap of the desired level in the reactor is completed by the external steam gas source (18). In a further embodiment of the present invention, a plurality of humidity, temperature, pressure, visual and optical sensors are positioned inside the gasification plasma reactor (7) in order to monitor its environmental conditions and amount of humidity of the incoming solid waste. The sensors data yield the required amount of additional steam gas and water vapor to be supplied by the stem gas source (18), considering the steam gas amount from the internal steam gas source from the thermal reaction at the bottom accumulator chamber (9).

In a further embodiment of the present invention, the bottom accumulator (8) is filled with cold water, a mixture of ice and water or a complete icy phase. Accordingly, the water temperature can be below the temperature of the surroundings close to the water freezing temperature or below it. This results in a higher thermal bias between the molten or vitreous slag and the cold phase of water, ice, or mixed phase of water and ice inside the bottom accumulator (8), yielding a significant enhancement in the production of steam gas. Hence, the system can improve the efficiency of solid waste decomposition into slag material and syngas or hydrogen gas from the solid waste material.

Figure 18A:
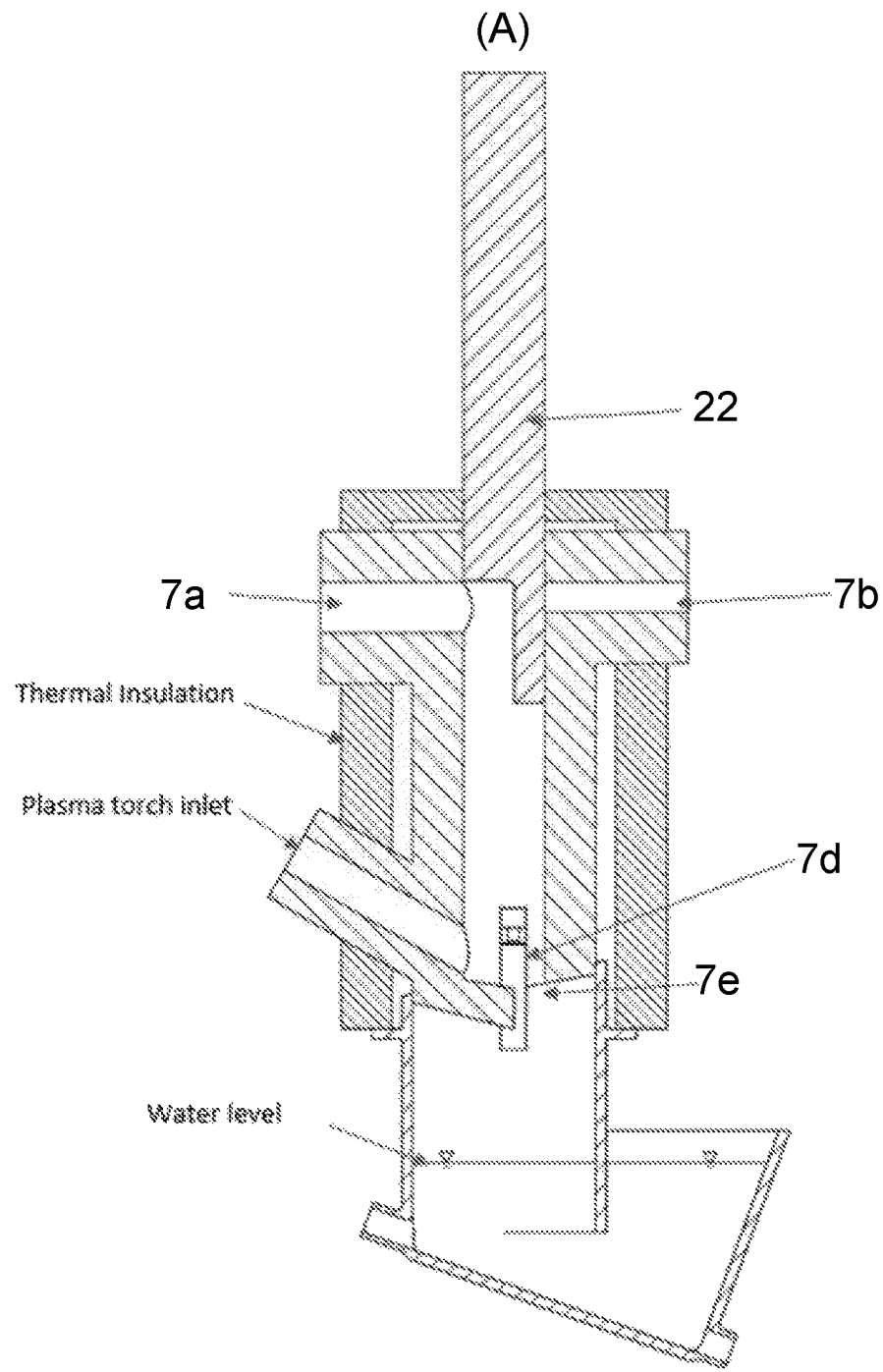
FIGS. 18A-B illustrate an optional configuration of the plasma reactor integrated together with an additional piston element in two operating states.
Figure 18B:
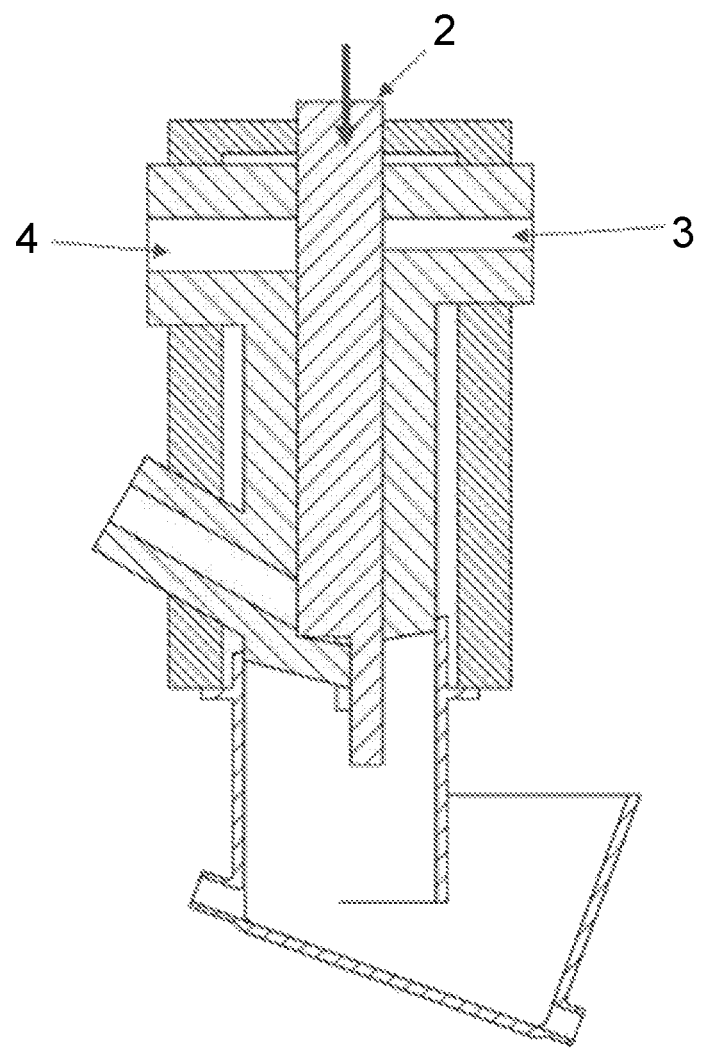

In another embodiment of the present invention, the system of the present invention comprises a piston (22) added to the plasma reactor at its top side. The piston (22) enables self-cleaning and maintenance procedures of the plasma reactor (7). The piston (22) essentially has two possible operational states, (A) and (B), as illustrated in FIGS. 18A-B, respectively. In state (A), shown in FIG. 18A, the piston is in its fully retracted position with respect to the plasma reactor top side. In state (B), the piston (22) is in fully inserted position inside the plasma reactor down to its bottom side. The piston in state (A) is used to separate the gases outlet (7b) from the solid waste upper inlet (7a). The piston in state (B) is used to mechanically clean the soot residues which are accumulated on the plasma reactor sidewalls and eliminate bridging effects inside the plasma reactor between its side walls. Further, at state (B), the piston (22) can also be fully inserted to mechanically clean slag residues from the plasma reactor outlet (7d) at the reactor bottom side by further pushing it into the bottom accumulator container (8). The self-cleaning maintenance procedure is done automatically by the piston (22). Alternatively, it can be executed periodically or at the beginning or end of a cleaning session. In a third option, a mechanical cleaning with the piston (22) is based on continuous or selected visual monitoring, where the image of the chamber condition is compared to its normal condition. Another option for scheduling mechanical cleaning of the reactor with the piston (22) is based on any the data from the sensors that such as optical, temperature pressure or humidity sensors, which are located inside or outside the gasification plasma reactor (7). Alternatively, the self-cleaning procedure may be manually done by an operator of the system.

The plant is essentially portable with holding handle (12) at its roof and a ramp (13) that matches the box's (2) floor and which is adjusted with rails (13a, 13b in FIG. 15) for lifting with a forklift. A Service window (14) on the front wall of the container casing (2) is provided for monitoring the ongoing process of waste processing and energy production within.

Figure 4:
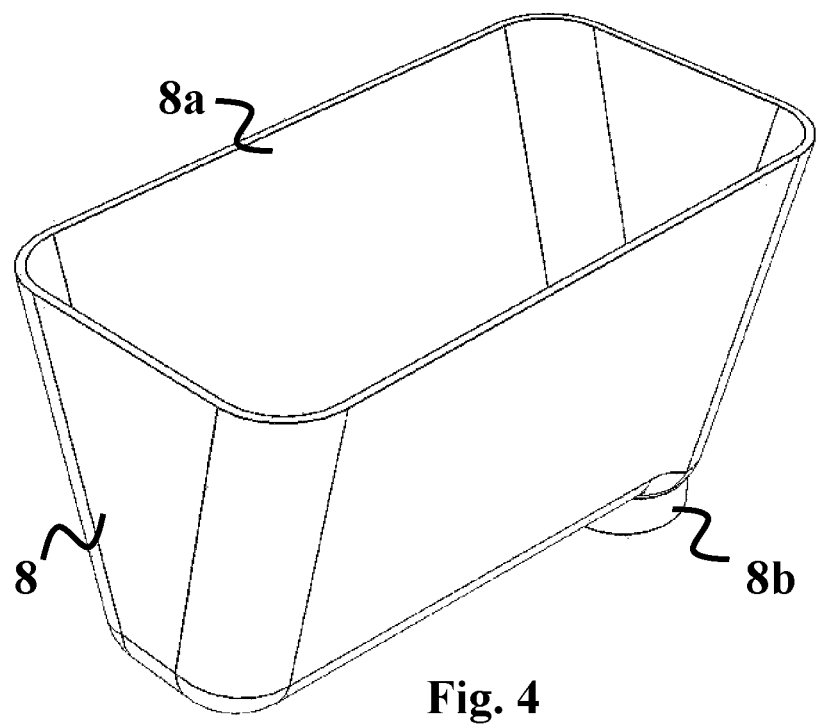

FIGS. 4-14 display the different components of the configuration as presented in FIGS. 2-3 and 15-16. These components are as follows in their order of appearance, parts of which are discussed above:

FIG. 4—liquids accumulator (8), which is positioned below the shredder (4) and grainer screw (5).

Figures 5A, 5B:
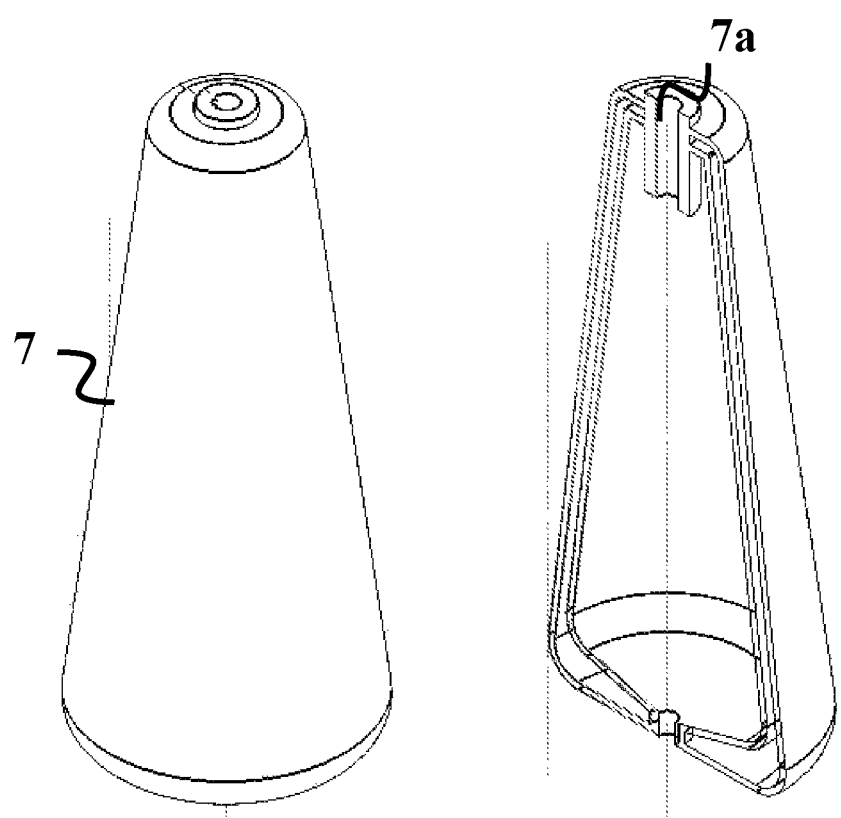

FIGS. 5A-5B—illustrate the reactor container (7) with upper inlet (7a) for connecting with the turbinate screw (6) and receiving the condensed waste.

Figure 6:
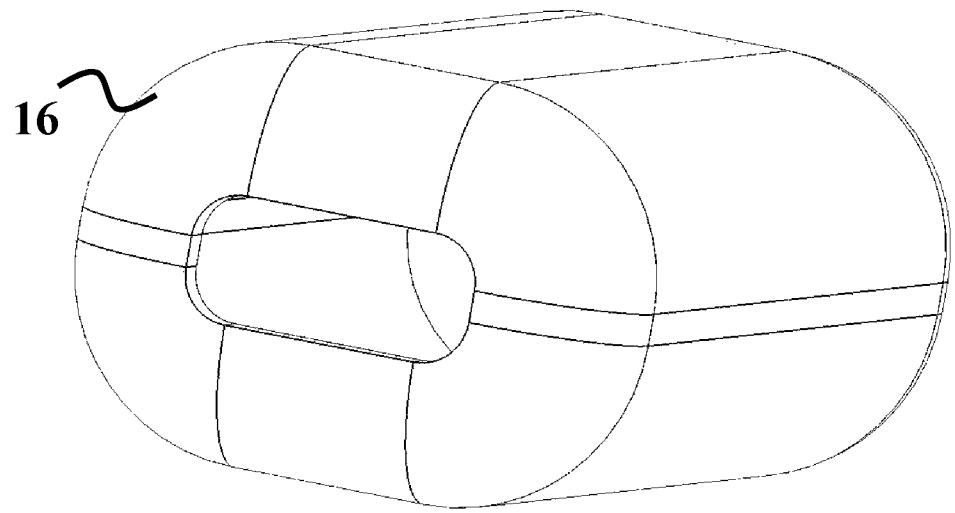

FIG. 6—illustrates a desalinator (16) in communication with the liquid accumulator (8) for further processing of the reclaimed water by removal of minerals, i.e., desalination, for example by reverse osmosis.

Figures 7A, 7B:
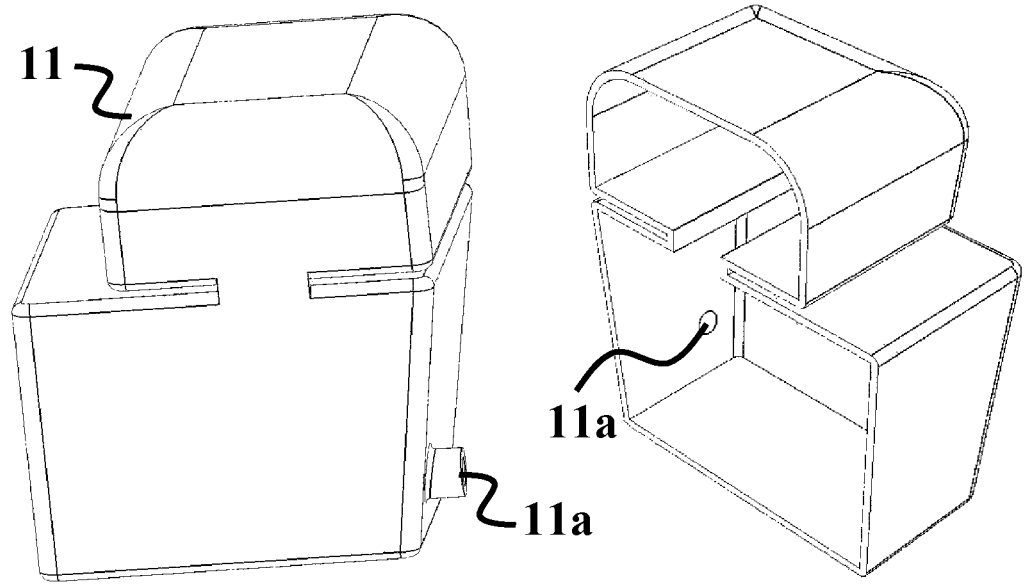

FIGS. 7A-7B—illustrate perspective and cross section the energy generator (11) that comprises an inlet (11a) in communication with the gas purifier (10) outlet (10b) for receiving the purified gas from and generating the type of desired energy.

FIG. 8—illustrates a solid accumulator (9) for receiving the solid residues left after processing, e.g., gasifying, within the reactor (7). The solid accumulator (9) is in direct communication with the outlet (7d) at the floor of the reactor (7) for receiving the solid waste after processing for further packing and disposal.

FIGS. 9A-9B—illustrate a gas purifier (10) with inlet (10a) for communicating with the reactor (7) for enabling flow of purified gas out of the reactor (7) and outlet (10b) for communicating the purified gas to the energy generator (11).

Figure 10:
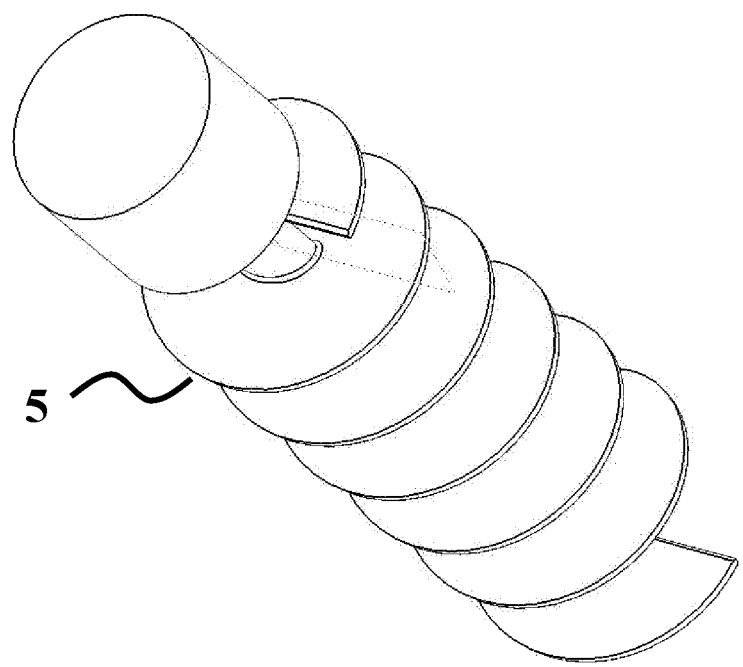

FIG. 10—illustrates a revolving grainer screw (5) for transporting the shredded solid component of the incoming waste to the turbinate screw (6) and releasing the liquid component down to the liquid container (8). The spiral shape of the grainer screw (5) increases its efficiency by further squeezing the shredded waste and elongating the path it goes, thus allowing better drainage of the liquids down.

Figure 11:
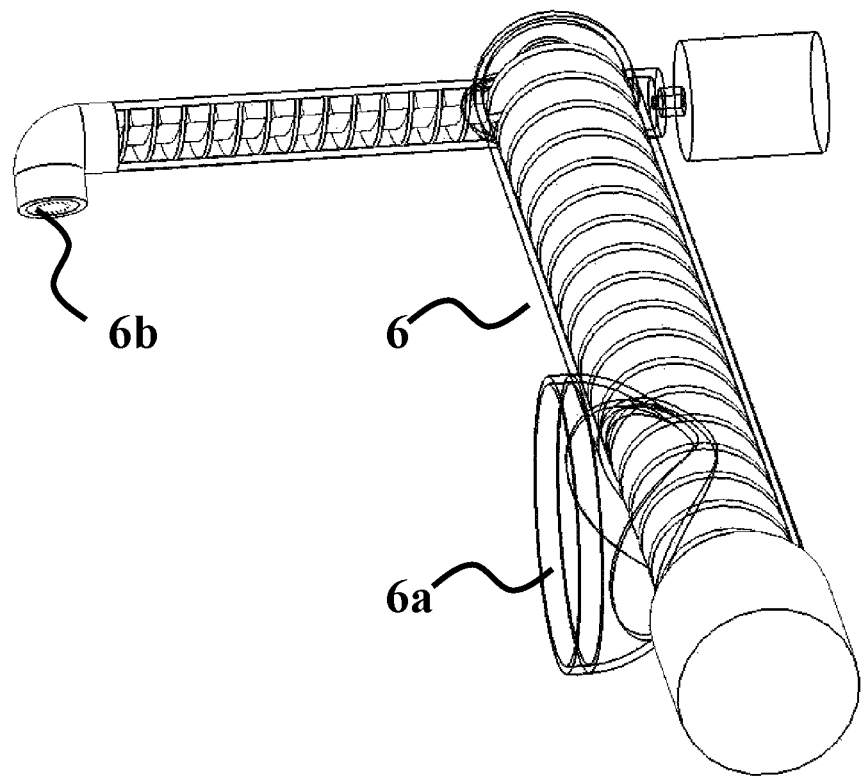

FIG. 11—illustrates a turbinate screw (6) for transporting the waste towards the reactor (7). The turbinate screw (6) connects with the grainer screw (5) with connector (6a) for receiving the shredded solid part of the waste and transporting it up in spiral move towards the inlet (7a) of the reactor (7). Also shown is inlet (6b) of the turbinate screw (6).

Figure 12:
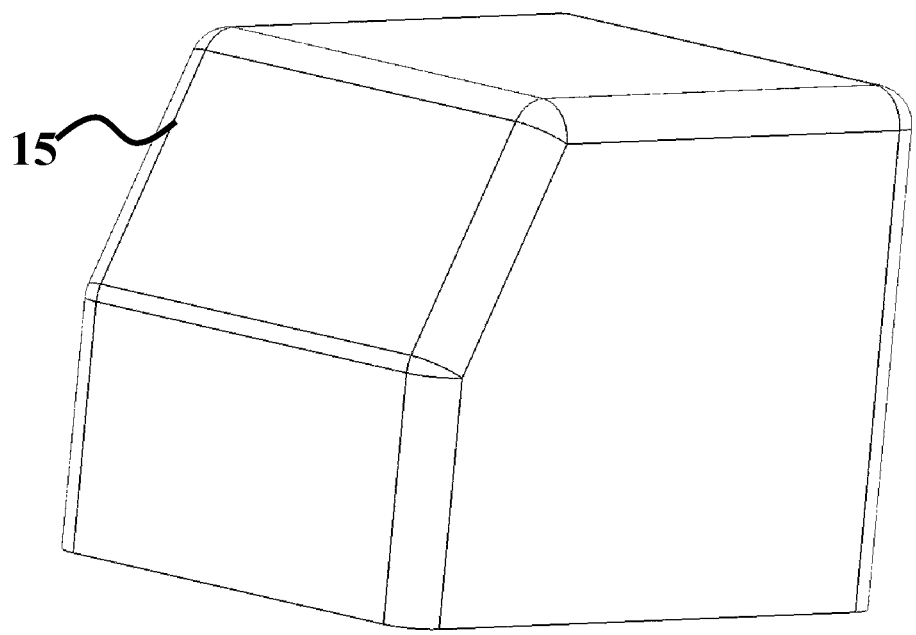

FIG. 12—illustrates an energy generator (15) that comprises means for generating the type of energy required for the reactor (7) to process the condensed solid waste. The energy generator (15) may comprise, for example, a cathode for producing an electric arc that produces plasma within the reactor, a microwave system or any other heating means. The energy generator is in communication with the reactor (7) through channel (15a) for channeling the energy produced, for example for gasifying the condensed solid waste in the reactor (7) using plasma arc. The energy generator (15) is located with the casing (2) and in proximity to the reactor (7) for efficient conveying of the energy produced (see 15 in FIG. 15).

Figure 13:
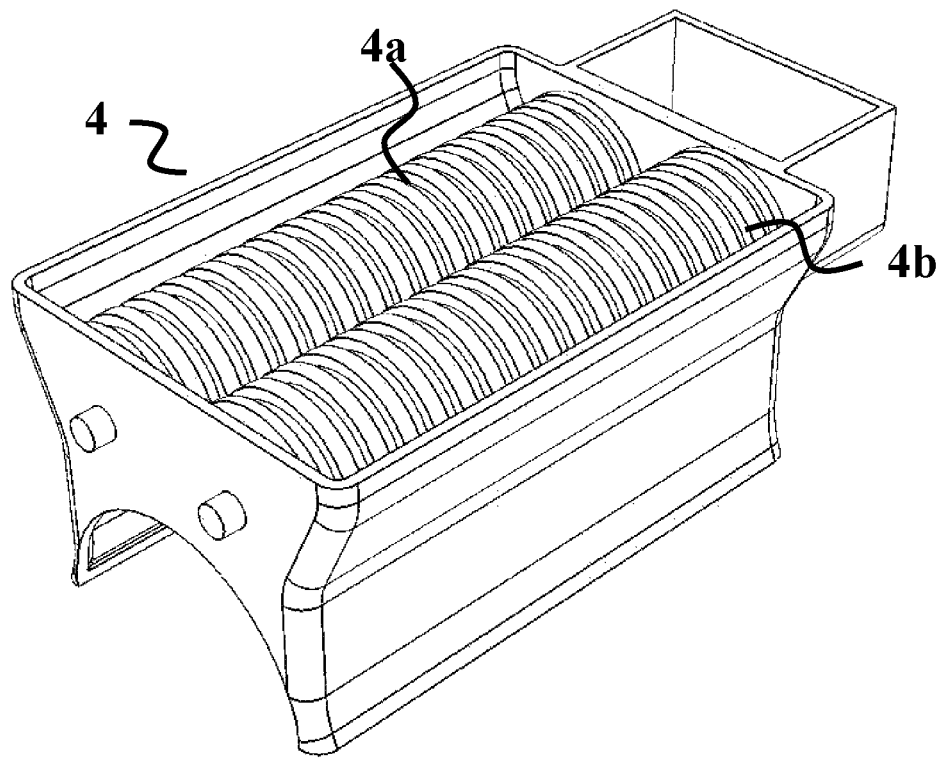

FIG. 13—illustrates a shredder (4) with two revolving spiral cylinders (4a, 4b). The incoming waste is fed to the shredder (4) by throwing it onto the revolving cylinders (4a, 4b). The cylinders (4a, 4b) synchronously revolve around their axes of rotation with sufficient torque for crushing hard solid waste into smaller pieces and squeezing liquids out.

FIG. 14—illustrates in more detail a plasma reactor (7) with an upper inlet (7a), a mouthpiece (7b) for releasing crude non-purified gas to a gas purifier (10), lower outlet (7d) for removing solid processed waste and three plasma torches (7c) at the reactor floor for providing plasma arc that decomposes the incoming solid waste and produces syngas or releasing hydrogen gas.

FIG. 15—illustrates another embodiment of space designated for the accumulated shredded waste for the control of the feeding rate for the reactor.

Figure 16:
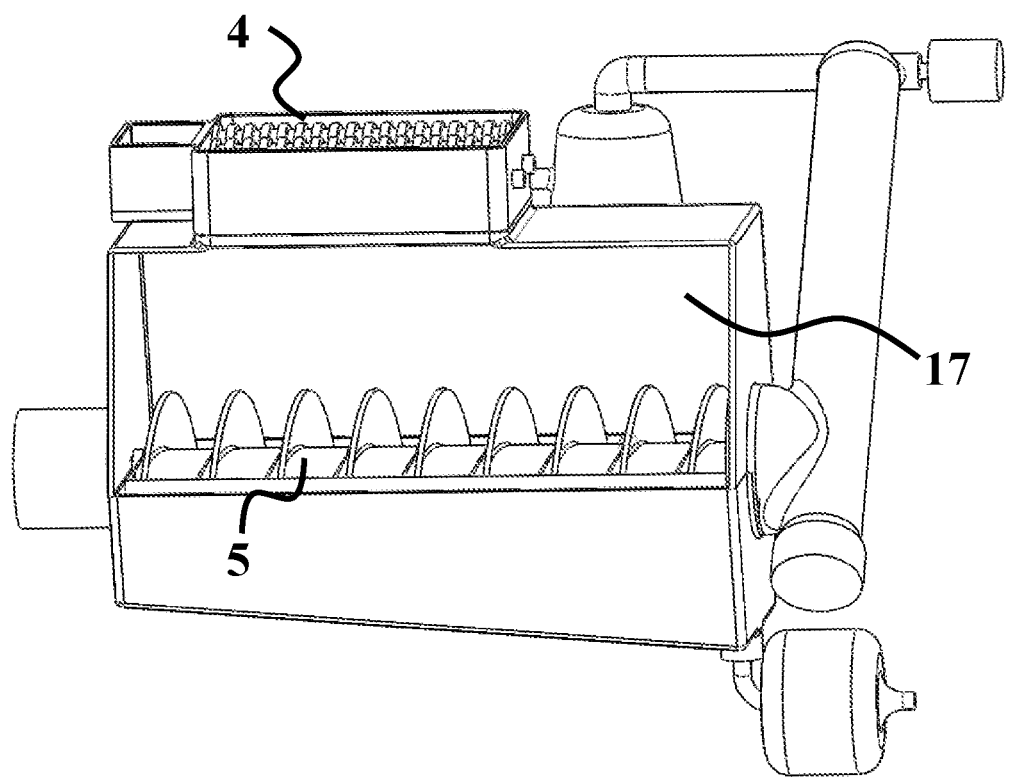

FIG. 16—illustrates a storage box (17) between the crusher (4) and conveyor (5). This box (17) is used as shredded waste accumulator and buffer that enables controlling the rate of feeding crushed and/or shredded waste from the crusher (4) to the conveyor (5) and adapting the speed of crushing and/or shredding waste to the conveying speed of conveying the crushed and/or shred waste further to the next station in the processing the waste in the container.

It should be noted that this configuration of the plant is only exemplary to a small scale onsite waste treatment plant of the present invention. Other configurations and relative conformations of the plant components are contemplated within the scope of the present invention.

The invention claimed is:

1. A waste disposal and treatment container for processing incoming waste, comprising:
   a housing, the following elements located within the housing;
      a shredder comprising a grainer screw and diagonally upward positioned turbinate screw,
      a liquid collection container located below the shredder;
      a plasma reactor located at a distal end of the turbinate screw which is upward of the grainer screw; and
      a single or plurality of breathing membranes in communication with the plasma reactor;
   wherein the grainer screw is configured to crush, grind and transport incoming waste into solid waste and liquid waste,
   wherein the turbinate screw configured to transport the solid waste from the grainer screw to the plasma reactor; and
   wherein the liquid collection container is configured to collect the liquid waste after it has been crushed by the grainer screw.

2. The waste disposal and treatment container of claim 1, further comprising a gas purifier, the gas purifier in fluid communication with the reactor through a gas outlet, wherein the gas purifier is configured to trap and filter out airborne solid contaminants to produce a purified gas.

3. The waste disposal and treatment container of claim 2, further comprising an energy generator in communication with the gas purifier, the energy generator receiving the purified gas from the gas purifier, and producing energy from the purified gas.

4. The waste disposal and treatment container of claim 3, further comprising a bottom accumulator in communication with the shredder.

5. The waste disposal and treatment container of claim 4, wherein the plasma reactor includes three plasma torches at the bottom of the reactor, and wherein the plasma reactor decomposes the incoming solid waste.

6. The waste disposal and treatment container of claim 5, wherein the decomposed incoming solid waste creates a molten or vitreous slag that falls to the reactor floor and passes through a lower outlet to the bottom accumulator.

7. The waste disposal and treatment container of claim 6, wherein the bottom accumulator is filled with water.

8. The waste disposal and treatment container of claim 1, wherein the waste disposal and treatment container has an entrance directly above the shredder for insertion of the incoming waste into the waste disposal and treatment container.

9. The waste disposal and treatment container of claim 1, wherein the liquid waste in the liquid collection container is purified by separating organic from aqueous phases of the liquid waste.

10. A waste disposal and treatment container for processing incoming waste, comprising:
    a housing, the following elements located within the housing;
       a shredder comprising a grainer screw and diagonally upward positioned turbinate screw,
       a liquid collection container located below the shredder; and
       a plasma reactor located at a distal end of the turbinate screw which is upward of the grainer screw;
    wherein the grainer screw is configured to crush, grind and transport incoming waste into solid waste and liquid waste,
    wherein the turbinate screw configured to transport the solid waste from the grainer screw to the plasma reactor; and
    wherein the liquid collection container is configured to collect the liquid waste after it has been crushed by the grainer screw,
    wherein the solid waste is rehydrated by injecting a steam gas and/or water vapor into the plasma reactor,
    wherein the steam gas and/or water vapor enhances and improves the decomposition process of the solid waste into the slag material,
    wherein the sensors are configured to measure humidity, temperature, pressure, and
    wherein data from the sensors is sent to a control unit and are used to calculate the amount of steam gas and/or water vapor needed.

11. The waste disposal and treatment container of claim 10, wherein the reactor is connected to a steam gas source through a single or a plurality of steam gas pipes.

12. The waste disposal and treatment container of claim 10, further comprising sensors positioned inside the plasma reactor.

13. The waste disposal and treatment container of claim 1, wherein the breathing membranes include a filter configured to eliminate or reduce entrance of undesirable by-products into the plasma reactor.

14. The waste disposal and treatment container of claim 1, wherein the breathing membranes are in connection to corresponding valves.

15. A waste disposal and treatment container for processing incoming waste, comprising:
- a housing, the following elements located within the housing;
  - a shredder comprising a grainer screw and diagonally upward positioned turbinate screw,
  - a liquid collection container located below the shredder; and
  - a plasma reactor located at a distal end of the turbinate screw which is upward of the grainer screw;
- wherein the grainer screw is configured to crush, grind and transport incoming waste into solid waste and liquid waste,
- wherein the turbinate screw configured to transport the solid waste from the grainer screw to the plasma reactor;
- wherein the liquid collection container is configured to collect the liquid waste after it has been crushed by the grainer screw,
- wherein the plasma reactor includes a piston at its top side,
- wherein said piston is configured for first operational state of fully retracted up position relative to said gasification plasma reactor and second operational state in fully inserted position inside said plasma gasification reactor,
- wherein in said first operational state, said piston separates outlet of syngas produced in said gasification plasma reactor and upper inlet of said solid waste, wherein said piston is configured to mechanically clean solidified elements in the path of the mass stream and soot residues from walls of said gasification plasma reactor side walls during transition from said first to said second operational states, and
- wherein when in said second operational state said piston is configured to reach bottom of said gasification plasma reactor and remove slag by pushing said slag out through bottom outlet of said gasification plasma reactor into said slag collector.

* * * * *